(12) United States Patent
Molinero Fernandez et al.

(10) Patent No.: US 9,998,343 B2
(45) Date of Patent: Jun. 12, 2018

(54) SELECTIVE EVENT REPORTING IN A MOBILE TELECOMMUNICATIONS NETWORK

(71) Applicant: Telefonaktiebolaget L M Ericsson (publ), Stockholm (SE)

(72) Inventors: Pablo Molinero Fernandez, Madrid (ES); Susana Fernandez Alonso, Madrid (ES); Reiner Ludwig, Hürtgenwald (DE); Irene Martin Cabello, Madrid (ES); Miguel Angel Muñoz de la Torre Alonso, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 131 days.

(21) Appl. No.: 14/650,130

(22) PCT Filed: Dec. 7, 2012

(86) PCT No.: PCT/EP2012/074815
§ 371 (c)(1),
(2) Date: Jun. 5, 2015

(87) PCT Pub. No.: WO2014/086431
PCT Pub. Date: Jun. 12, 2014

(65) Prior Publication Data
US 2015/0319058 A1 Nov. 5, 2015

(51) Int. Cl.
*H04L 12/26* (2006.01)
*H04L 12/24* (2006.01)
(Continued)

(52) U.S. Cl.
CPC ........ *H04L 43/065* (2013.01); *H04L 41/0613* (2013.01); *H04L 41/0893* (2013.01);
(Continued)

(58) Field of Classification Search
CPC ............. H04L 41/0893; H04L 41/0613; H04L 43/065
See application file for complete search history.

(56) References Cited

U.S. PATENT DOCUMENTS

2009/0254494 A1   10/2009   Li et al.

FOREIGN PATENT DOCUMENTS

WO   WO 2010/136070 A1   12/2010

OTHER PUBLICATIONS

International Search Report and Written Opinion of the International Searching Authority, PCT International Application No. PCT/EP2012/074815, dated Oct. 30, 2013.
(Continued)

*Primary Examiner* — Jackie Zuniga Abad
(74) *Attorney, Agent, or Firm* — Sage Patent Group

(57) ABSTRACT

For event reporting between a first node and a second node of a mobile telecommunications network, the second node sends an indication to the first node to subscribe to reporting of a certain event type by the first node. The indication may specify that a change in type of radio access technology, as used by a user equipment for connecting to the telecommunications network, is to be reported from the first node to the second node. The second node may provide additional information to the first node to further specify a subtype of the event to be reported. The additional information may specify at least one type of radio access technology. Based on detecting the event of the specified event type and subtype, e.g., a change to or from a specific type of radio access technology, the first node sends a report of the detected event to the second node.

19 Claims, 8 Drawing Sheets

(51) Int. Cl.
  *H04W 84/04* (2009.01)
  *H04L 12/14* (2006.01)
  *H04W 4/24* (2018.01)
  *H04M 15/00* (2006.01)

(52) U.S. Cl.
  CPC ........ *H04L 12/1407* (2013.01); *H04L 43/028* (2013.01); *H04M 15/66* (2013.01); *H04W 4/24* (2013.01); *H04W 84/042* (2013.01)

(56) References Cited

OTHER PUBLICATIONS

International Preliminary Report on Patentability, PCT International Application No. PCT/EP2012/074815, dated Apr. 2, 2015.
3GPP, Technical Specification, "3rd Generation Partnership Project; Technical Specification Group Services and System Aspects; Policy and charging control architecture (Release 11)", 3GPP TS 23.203 V11.7.0 (Sep. 2012), 178 pp.
3GPP, Technical Specification, "3rd Generation Partnership Project; Technical Specification Group Core Network and Terminals; Policy and Charging Control (PCC); Reference points (Release 11)", 3GPP TS 29.212 V11.6.0 (Sep. 2012), 194 pp.

```
<CC-Answer> ::=  < Diameter Header: 272, PXY >
                 < Session-Id >
                 ...
                *[ Event-Trigger ]
                 ...
                *[ Event-Trigger-Information ]
                 ...
```
210

```
<RA-Request> ::= < Diameter Header: 258, REQ, PXY >
                 < Session-Id >
                 ...
                *[ Event-Trigger ]
                 ...
                *[ Event-Trigger-Information ]
                 ...
```
220

FIG. 2

```
Event-Trigger-Information ::= < AVP Header: xxxx >
                              [ Event-Trigger ]
                            * [ RAT-Type ]
                            * [ 3GPP-SGSN-MCC-MNC ]
                            * [ 3GPP-MS-TimeZone ]
                            * [ AVP ]
```

SELECTIVE EVENT REPORTING IN A MOBILE TELECOMMUNICATIONS NETWORK

CROSS REFERENCE TO RELATED APPLICATION

This application is a 35 U.S.C. § 371 national stage application of PCT International Application No. PCT/EP2012/074815, filed on 7 Dec. 2012, the disclosure and content of which is incorporated by reference herein in its entirety. The above-referenced PCT International Application was published in the English language as International Publication No. WO 2014/086431 A1 on 12 Jun. 2014.

TECHNICAL FIELD

The present invention relates to methods for reporting events in a mobile telecommunications network and to corresponding devices.

BACKGROUND

In mobile telecommunications networks, event reporting may be used for providing inputs to certain control processes. For example, in 3GPP ($3^{rd}$ Generation Partnership Project) mobile networks, e.g., GSM (Global System for Mobile communications), UMTS (Universal Mobile Telecommunications System), or LTE (Long Term Evolution) networks, a reported event may trigger establishment or configuration of a bearer for carrying data of a packet based service to or from a user equipment (UE).

In 3GPP mobile networks, a policy and charging control (PCC) architecture as defined in 3GPP Technical Specification 23.203 may be provided so as to support such event reporting and control processes. This PCC architecture may be used for controlling various types of radio access technology (RAT) and corresponding radio access networks, including 3GPP accesses such as GERAN (GSM Radio Access Network), UTRAN (UMTS Terrestrial Radio Access Network) and E-UTRAN (Evolved UTRAN), and non-3GPP accesses, e.g., based on WLAN (Wireless Local Area Network). In the following, such designations of radio access networks will also be used to designate the underlying RAT. One type of event which may be reported in a mobile network implementing two or more of such RAT types may be a change of the RAT type used by the UE for connecting to the mobile network. Other events which may be reported are for example changes in the location of the UE. In such cases, for example a node referred to as Policy and Charging Rules Function (PCRF) may subscribe to reporting of such events by a node referred to as Policy and Charging Enforcement Function (PCEF). If the specified type of event is detected by the PCEF, the PCEF reports the event to the PCRF.

For certain control processes, the PCRF may obtain input information by subscribing to event reporting by the PCEF. For example, some policies applied by the PCRF may depend on whether the UE presently uses a specific RAT type, e.g., E-UTRAN, and therefore subscribe to reporting of RAT type changes by the PCEF. The reported RAT type change may at the same time also indicate the new RAT type. For example, establishing dedicated bearers may be supported only in E-UTRAN, and through reporting of RAT type changes the PCRF may become aware whether the UE uses E-UTRAN for accessing the mobile network or not. Based on this information, the PCRF may for example decide whether to initiate establishment of a new dedicated bearer (if the presently used access is E-UTRAN) or to modify an existing default bearer (if the presently used access is not E-UTRAN) so as to provide a desired Quality of Service (QoS) for data traffic to or from the UE.

However, the above way of learning about the current status of the UE through reported events may in some cases be inefficient or even not possible. For example, in some scenarios there may be a large amount of handovers between GERAN and UTRAN, e.g., if a high load in the UMTS network part or certain environmental factors, e.g., dense buildings, cause temporal or local variations in UMTS coverage.

Accordingly, there is a need for techniques which allow for efficiently reporting events in a mobile telecommunications network.

SUMMARY

According to an embodiment of the invention, a method of event reporting between a first node and a second node of a mobile telecommunications network is provided. According to the method, the first node receives an indication from the second node. The indication specifies that a change in type of RAT used by a UE for connecting to the telecommunications network is to be reported from the first node to the second node. Further, the first node receives additional information from the second node. The additional information specifies at least one type of RAT. In response to the first node detecting a change of the UE to or from said at least one type of RAT, the first node sends a report of the detected change in type of RAT to the second node.

According to a further embodiment of the invention, a method of event reporting between a first node and a second node of a mobile telecommunications network is provided. According to the method, the second node sends an indication to the first node. The indication specifies that a change in type of RAT used by a UE for connecting to the telecommunications network is to be reported from the first node to the second node. Further, the second node sends additional information to the first node. The additional information specifies at least one type of RAT. In response to a change of the UE to or from said at least one type of RAT, the second node receives a report of the detected change in type of RAT from the first node.

According to a further embodiment of the invention, a method of event reporting between a first node and a second node of a mobile telecommunications network is provided. According to the method, the first node receives a first information element from the second node. The first information element specifies a type of an event which is to be reported from the first node to the second node. Further, the first node receives a second information element from the second node. The second information element comprises additional information for specifying a subtype of the event to be reported. The second information element is associated with the first information element by comprising an indication of the type of event specified in the first information element. In response to the first node detecting the event of said type and subtype, the first node sends a report of the detected event to the second node.

According to a further embodiment of the invention, a method of event reporting between a first node and a second node of a mobile telecommunications network is provided. According to the method, the second node sends a first information element to the first node. The first information element specifies a type of an event which is to be reported from the first node to the second node. Further, the second node sends a second information element to the first node. The second information element comprises additional information for specifying a subtype of the event to be reported. The second information element is associated with the first information element by comprising an indication of the type of event specified in the first information element. In response to the event of said type and subtype, the second node receives a report of the detected event from the first node.

According to a further embodiment of the invention, a node for a mobile telecommunications network is provided. The node comprises an interface with respect to a further node of the telecommunications network and a processor. The processor is configured to:
  receive from the further node an indication specifying that a change in type of RAT used by a UE for connecting to the telecommunications network is to be reported from the node to the further node,
  receive from the further node additional information specifying at least one type of RAT, and
  in response to detecting a change of the UE to or from said at least one type of RAT, send a report of the detected change in type of RAT to the further node.

According to a further embodiment of the invention, a node for a mobile telecommunications network is provided. The node comprises an interface with respect to a further node of the telecommunications network and a processor. The processor is configured to:
  send to the further node an indication specifying that a change in type of RAT used by a UE for connecting to the telecommunications network is to be reported from the further node to the node,
  send to the further node additional information specifying at least one type of RAT, and
  in response to a change of the UE to or from said at least one type of RAT, receive a report of the detected change in type of RAT from the further node.

According to a further embodiment of the invention, a node for a mobile telecommunications network is provided. The node comprises an interface with respect to a further node of the telecommunications network and a processor. The processor is configured to:
  receive from the further node a first information element specifying a type of an event which is to be reported from the node to the further node,
  receive from the further node a second information element comprising additional information for specifying a subtype of the event to be reported, the second information element being associated with the first information element by comprising an indication of the type of event specified in the first information element, and
  in response to detecting the event of said type and subtype, send a report of the detected event to the further node.

According to a further embodiment of the invention, a node for a mobile telecommunications network is provided. The node comprises an interface with respect to a further node of the telecommunications network and a processor. The processor is configured to:
  send to the further node a first information element specifying a type of an event which is to be reported from the further node to the node,
  send to the further node a second information element comprising additional information for specifying a subtype of the event to be reported, the second information element being associated with the first information element by comprising an indication of the type of event specified in the first information element, and
  in response to the event of said type and subtype, receive a report of the event from the further node.

According to a further embodiment of the invention, a system for event reporting in a mobile telecommunications network is provided. The system comprises a first node and a second node operating in accordance with one of the above methods.

According to a further embodiment of the invention, a computer program product is provided, e.g., in the form of a computer readable storage medium, the computer program product comprises computer readable program code that, when executed by a processor of a node of a mobile telecommunications network, causes the node to operate as the first node or second node of any of the above methods.

BRIEF DESCRIPTION OF THE DRAWINGS

FIG. 2 shows exemplary structures of messages which may be used in an embodiment of the invention.

FIG. 3 shows an exemplary structure of an information element which may be used in an embodiment of the invention.

DETAILED DESCRIPTION OF EMBODIMENTS

In the following, concepts in accordance with exemplary embodiments of the invention will be explained in more detail by to the accompanying drawings. The illustrated embodiments relate to concepts for traffic monitoring in a mobile network implementing different RAT types, e.g., 3GPP RAT types such as GERAN, UTRAN, and/or E-UTRAN. However, other RAT types could be used as well, including non-3GPP RAT types such as WLAN. The concepts in particular have the purpose of providing efficient reporting of events related to a UE connected to the mobile network.

Figure 1:
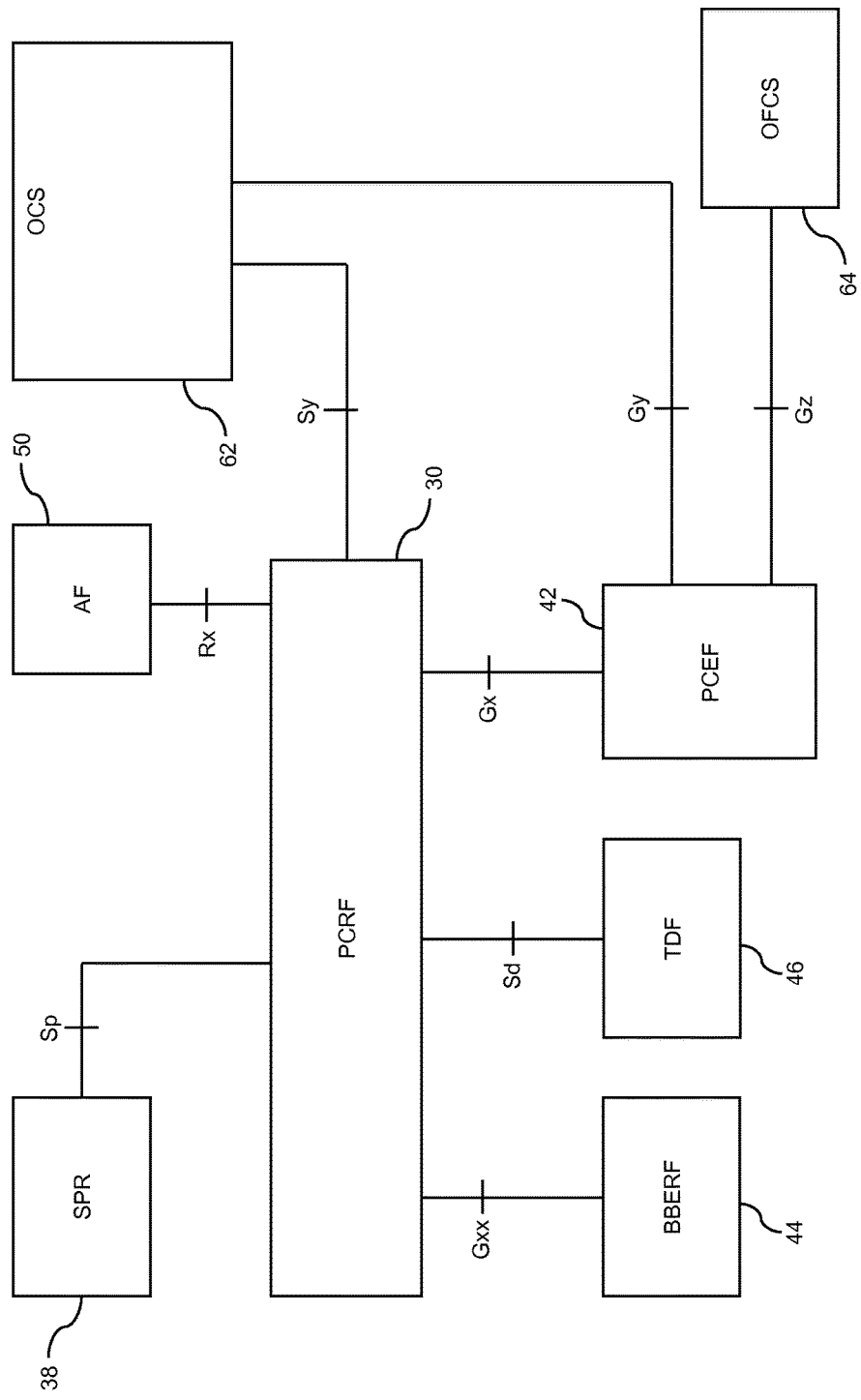
FIG. 1 schematically illustrates an exemplary policy control architecture in which concepts according to an embodiment of the invention may be applied.

FIG. 1 illustrates a PCC architecture according to 3GPP TS 23.203. As illustrated, the PCC architecture includes a policy controller in the form of a PCRF 30 and a PCEF 42. Further, the PCC architecture may include an application function (AF) 50. The PCEF 42 may be implemented in a gateway for providing a packet data connection to a UE (not illustrated in FIG. 1), e.g., in a Packet Data Network Gateway (PGW) or a General Packet Radio Service Gateway Support Node (GGSN). The AF 50 may be implemented in an application server. An example of the AF 50 is the Proxy Call Session Control Function (P-CSCF) of the Internet Protocol Multimedia Subsystem (IMS). In addition or as an alternative to the PCEF 42, the PCC architecture may also include a Bearer Binding and Event Reporting Function (BBERF) 44. Also the BBERF 44 may be implemented in a gateway for providing a packet data connection to a UE, e.g., in a Serving Gateway (SGW) or Mobile Access Gateway (MAG) of a non-3GPP mobile network. The PCRF 30 is typically implemented in a standalone node.

The PCC architecture may also include a Traffic Detection Function (TDF) 46. The TDF 46 may be implemented as a stand-alone node, e.g., in a traffic monitoring device, with access to data traffic of the UE or may be co-located with a gateway routing the data packets to or from the UE. For example, the TDF 46 may be co-located in the same gateway with the PCEF 42.

Still further, the PCC architecture may include an Online Charging System (OCS) 62, and/or an Offline Charging System (OFCS) 64 which may be used for integrating online and offline charging processes.

As further illustrated, the PCC architecture may also include a repository 38. In the illustrated example, the repository 38 corresponds to a Subscriber Profile Repository (SPR). However, it is to be understood that other types of repository could be used as well, e.g., a User Data Repository (UDR). The repository 38, which may be a standalone database or integrated into an existing subscriber database such as a Home Subscriber Server (HSS), may include information such as entitlements, rate plans, etc. The repository 38 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a QoS related subscriber category, e.g., whether the subscriber is a gold user to be provided with a high QoS or a silver or bronze user to be provided with lower QoS.

The PCRF 30 may be configured to perform policy control decision and/or flow based charging control. The PCRF 30 may provide network control regarding detection of service data flow detection, gating, and/or QoS towards the PCEF 42 and/or BBERF 44. With respect to the PCEF 42, the PCRF 30 may also provide network control regarding flow based charging. The PCRF 30 may be responsible for managing individual policies defining network, application, and subscriber conditions that must be met in order to successfully deliver a service or maintain the QoS of a given service. For this purpose, the PCRF 30 may signal PCC rules to the PCEF 42 and/or may signal QoS rules to the BBERF 44.

In the illustrated implementation, the PCEF 42 may be responsible for enforcing policies with respect to authorization to access and services, accounting and mobility. Such policies may be provided by the PCRF through PCC rules. The PCEF 42 may be configured to perform service data flow detection, policy enforcement and flow based charging functionalities, which is typically accomplished by applying the PCC rules as signaled by the PCRF 30. Further, the PCEF 42 may also implement functionalities of packet inspection, such as Deep Packet Inspection (DPI), and service classification. In this way data packets may be classified according to PCC rules defined in the PCEF 42 and be assigned to a certain service. The BBERF 44 may provide similar functionalities as the PCEF 42 by enforcing the QoS rules signaled by the PCRF 30. However, flow based charging and DPI are typically not supported by the BBERF 44.

Basic functionalities of the TDF 46 may include monitoring the data traffic of a UE so as to detect usage of specific services. This monitoring may for example be based on DPI. Here, DPI may include inspection and analysis of data packet content and service classification based on said analysis. This may be accomplished on the basis of a configured tree of classification rules, e.g., provided by the PCRF 30 through ADC rules. The TDF 46 allows for defining policies with regard to the detected services. Further details of the TDF 46 may be as described in 3GPP TS 23.203.

As further illustrated in FIG. 1, the nodes of the PCC architecture are coupled to each other by interfaces or reference points termed as Gx, Gxx, Gy, Gz, Sd, Sp, Sy, and Rx. The Gx reference point resides between the PCRF 30 and the PCEF 42. The Gxx reference point resides between the PCRF 30 and the BBERF 44. The Gy reference point resides between the PCEF 42 and the OCS 62. The Gz reference point resides between the PCEF 42 and the OFCS 64. The Rx reference point resides between the AF 50 and the PCRF 30. The Sp reference point resides between the repository 38 and the PCRF 30. The Sd reference point resides between the TDF 46 and the PCRF 30. The Sy reference point resides between the PCRF 30 and the OCS 62. As described below, the Gx, Gxx, Rx, and Sd reference points may be used for event reporting. These reference points are based on the Diameter protocol as specified in IETF RFC 3588. Details concerning the implementation of these interfaces can be found, e.g., in 3GPP TS 23.203, 29.212, 29.213, and 29.214. It should be noted that in other implementations different types of interfaces could be used.

In the above PCC architecture, reporting of events between nodes may be supported. For example, the PCRF 30 may subscribe to event reporting at the PCEF 42, using the Gx interface. Similarly, the PCRF 30 may subscribe to event reporting by the BBERF 44, using the Gxx reference point. Still further, the AF 50 may subscribe to event reporting by the PCRF 30, using the Rx interface. Moreover, the TDF 46 may subscribe to event reporting by the PCRF 30, using the Sd interface. In each case, the node subscribing to the event reporting at another node will send an indication of the type of event to be reported to the other node, and the other node will return a report if an event of the specified type occurs. An exemplary type of event to be reported is a change of RAT type. The latter type of event may for example be useful if certain control operations performed by the subscribing node depend on the presently utilized RAT type. On the other hand, event reporting may cause significant load on the participating nodes and the interface therebetween.

For example, in some scenarios the PCRF 30 may perform policy decisions on the basis of the RAT type presently used by a UE for connecting to the telecommunications network, e.g., when providing PCC rules to the PCEF 42. The PCRF 30 may therefore subscribe at the PCEF 42 to reporting of changes in the RAT type used by the UE. In this way, the PCRF 30 may become aware of the presently utilized RAT type. However, if there are frequent changes of RAT type, this may also cause significant load on the Gx interface, the PCEF 42, and in particular the PCRF 30. To address such issues, concepts according to embodiments of the invention as described in the following utilize that the PCRF 30 may only need to be aware of a certain RAT type being utilized, e.g., E-UTRAN, to apply the corresponding policies, so that not all RAT type changes, but only changes to or from this certain RAT type are relevant.

For example, in those scenarios where dedicated bearers are only supported in LTE, i.e., for E-UTRAN accesses, the PCRF 30 may be interested in RAT type changes from any RAT type to E-UTRAN and vice-versa in order to perform a policy decision on the establishment of a dedicated bearer. Such policy decision could for example result in establishing a dedicated bearer if the UE starts using a given service and the utilized RAT type is E-UTRAN or alternatively to modify the QoS of a default bearer if the UE uses another RAT type, e.g., UTRAN access or GERAN.

In the following, mechanisms will be further described which allow for implementing event reporting in an efficient manner by supporting selective reporting of a subtype of a given event type. For example, such mechanisms may be used for reporting only changes to or from a certain RAT type, e.g., to or from E-UTRAN. In this way, the load on the nodes involved in the event reporting may be reduced significantly. In the following, this mechanism will be illustrated by referring to the reporting of a change in RAT type between the PCEF 42 and the PCRF 30, using the Gx interface. However, it should be understood that the illustrated mechanism may be applied in a corresponding manner to the reporting of other event types, e.g., a change in the Public Land Mobile Network (PLMN) used by the UE, a change of the time zone in which the UE is located, a change in the location of the UE, or the like. Further, the mechanism could also be applied in a corresponding manner between other nodes, e.g., for reporting of events from the BBERF 44 to the PCRF 30, using the Gxx interface, for reporting of events from the PCRF 30 to the AF 50, using the Rx interface, and/or for reporting of events from the PCRF 30 to the TDF 46, using the Sd interface.

According to the illustrated mechanism, the PCRF 30 may subscribe at the PCEF 42 to reporting of changes in the RAT type used by the UE. For this purpose, the PCRF 30 may indicate to the PCEF 42 that PCC rules shall be requested by the PCEF 42 when the RAT type used by the UE changes to or from a given RAT type, e.g., E-UTRAN. This is accomplished by providing the PCEF 42 not only with information on the type of the event to be reported, i.e., a change in the RAT type used by the UE, but also with additional information on a subtype of the event to be reported, e.g., by specifying one or more specific RAT types. The PCEF 42 may then selectively report events corresponding to the specified event type and subtype, e.g., only changes to or from a certain RAT type specified in the additional information, or changes between two RAT types specified in the additional information. In this way, the load on the PCEF 42, the Gx interface, and in particular the PCRF 30 may be significantly reduced as compared to reporting of all changes in the RAT type.

According to an exemplary implementation, the additional information may be provided in a corresponding Attribute Value Pair (AVP) of the Diameter based protocol on the Gx interface. The PCRF 30 may optionally include this AVP into a protocol message to the PCEF 42 if selective reporting of only a certain event subtype is needed. Examples of such protocol messages are illustrated in FIG. 2.

FIG. 2 shows an exemplary structure of a Credit Control Answer (CCA) message 210 which may be transmitted from the PCRF 30 to the PCEF 42. As can be seen, the CCA message includes an AVP referred to as "Event Trigger" and a further AVP referred to as "Event Trigger Information". Further, FIG. 2 also illustrates an exemplary structure of a Re-Authentication/Authorization Request (RAR) message 220 which may be transmitted from the PCRF 30 to the PCEF 42. The AVPs "Event Trigger" and "Event Trigger Information" are also provided in the RAR message 220. In this implementation, the AVP "Event Trigger" may be used as an information element specifying the event type to be reported, e.g., as "RAT Change", and the AVP "Event Trigger Information" may be used as a further independent information element comprising the additional information for specifying the subtype of the event type, e.g., by specifying one or more RAT types. The AVP "Event Trigger Information" may be of the "grouped" type and include a number of subordinate further AVPs, e.g., as illustrated in FIG. 3.

As illustrated in FIG. 3, the AVP "Event Trigger Information" 250 includes a subordinate AVP referred to as "RAT Type". In this subordinate AVP, a certain RAT Type may be specified, e.g., E-UTRAN, thereby indicating that RAT type changes to or from this RAT type are to be reported in a selective manner. As further illustrated, the AVP "Event Trigger Information" 250 may also include a subordinate AVP referred to as "Event Trigger". This subordinate AVP may be used for identifying the event type to which the additional information in the AVP "Event Trigger Information" 250 relates. The latter structure allows for efficiently using the AVP "Event Trigger Information" 250 for any event types to be reported, e.g., a change in the PLMN used by the UE, a change in the time zone in which the UE is located, or a change in the location of the UE. Moreover, using separate information elements for indicating the event type and for specifying the subtype of the event type allows for reusing existing mechanisms of triggering event reports, e.g., as described in 3GPP TSs 23.203, 29.212, and 29.214, and optionally adding the AVP "Event Trigger Information" 250 if selective reporting of a certain event subtype is needed.

For example, if additional information for selectively reporting a subtype of RAT type changes are provided in the AVP "Event Trigger Information" 250, the subordinate AVP "Event Trigger" may indicate "RAT Change" and the additional information may be provided in one or more instances of the subordinate AVP "RAT Type". If two instances of the subordinate AVP "RAT Type" are provided, this may indicate that changes between these two RAT types should be selectively reported. If additional information for selective reporting of a subtype of PLMN changes are provided in the AVP "Event Trigger Information" 250, the subordinate AVP "Event Trigger" may indicate "PLMN Change" and the additional information may be provided one or more instances of a subordinate AVP referred to as "3GPP-SGSN-MCC-MNC" to identify one or more specific PLMNs for which changes are to be reported in a selective manner. If additional information for selective reporting of a subtype of time zone changes are provided in the AVP "Event Trigger Information" 250, the subordinate AVP "Event Trigger" may indicate "UE Time Zone Change" and the additional information may be provided in one or more instances of a subordinate AVP referred to as "3GPP-MS-TimeZone" to identify one or more specific time zones for which changes are to be reported in a selective manner.

The AVP "Event Trigger Information" 250 may be sent from the PCRF 30 to the PCEF 42 to indicate that when the event included within the AVP "Event Trigger" is detected by the PCEF 42 and corresponds to the specified subtype, e.g., matches a RAT type as specified in one of the subordinate AVPs "RAT Type", the PCEF 42 should notify the PCRF 30 by sending a report. Other RAT type changes would not be reported.

Figure 4:
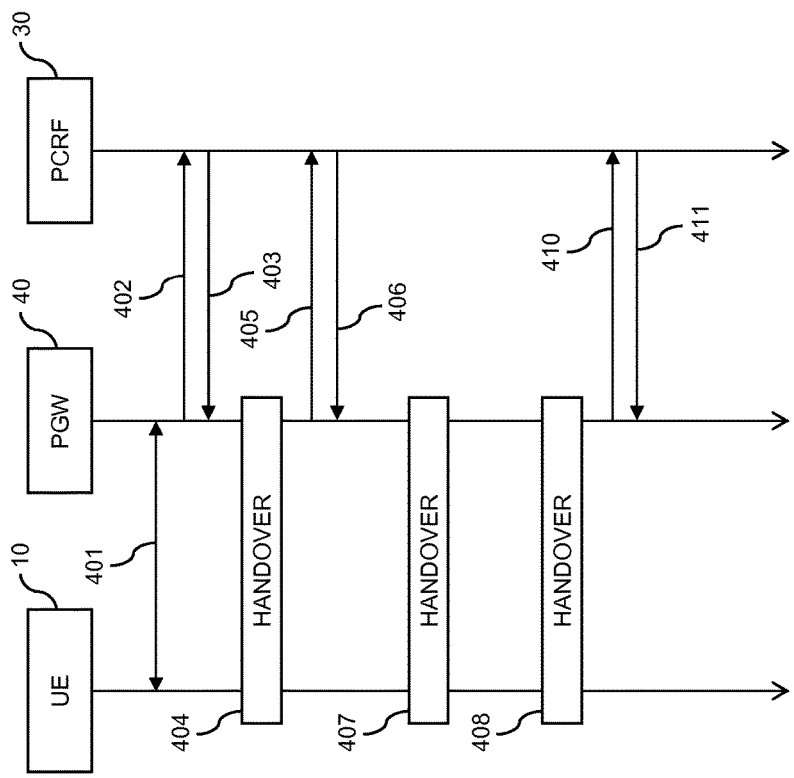
FIG. 4 shows an exemplary signaling diagram for illustrating procedures according to an embodiment of the invention.

In the following, the above concepts will be further explained by referring to exemplary procedures as illustrated in FIG. 4. The procedures of FIG. 4 relate to establishing an IP-CAN (Internet Protocol Connectivity Access Network) session for a UE 10. The procedures of FIG. 4 involve the UE 10, a PGW 40, and the PCRF 30. The PGW 40 is assumed to implement the above-described PCEF 42.

Initially, the UE 10 and the PGW 40 may transmit messages 401 for initiating IP-CAN session establishment. The PGW 40 may then proceed by sending message 402 to the PCRF 30 so as to request authorization of the IP-CAN session. Message 402 may also indicate the RAT type currently used by the UE 10. In the illustrated example, this RAT type is assumed to be E-UTRAN. Message 402 may be an initial Credit Control Request (CCR) message of the Diameter based protocol on the Gx interface. The PCRF 30 may respond to the PGW 40 with message 403, so as to indicate whether the IP-CAN session is authorized. Message 403 may be an initial CCA message of the Diameter based protocol on the Gx interface.

As explained in connection with FIGS. 2 and 3, message 403 may include the AVP "Event Trigger" with the value "RAT Change" to specify that changes in the RAT type used by the UE 10 for connecting to the telecommunications network should be reported from the PGW 40 to the PCRF 30. Further, message 403 may also include the AVP "Event Trigger Information" to specify certain RAT types for which selective reporting is requested. In the illustrated example, it is assumed that the AVP "Event Trigger Information" includes the subordinate AVP "Event Trigger" with value "RAT Change" and the subordinate AVP "RAT Type" with value "E-UTRAN", thereby indicating that an event report should be triggered when the UE changes from or to E-UTRAN. Message 403 may also be used to install PCC rules in the PGW 40, e.g., by configuring a dedicated bearer between the UE 10 and the PGW 40 with certain QoS parameters.

Step 404 indicates a handover of the UE 10 from E-UTRAN to UTRAN. Since this handover corresponds to a change to or from the RAT type specified in message 403, the PGW 40 detects the RAT type change as event to be reported and sends message 405 to the PCRF 30. Message 405 may be an update CCR message of the Diameter based protocol on the Gx interface. Message 405 may report the change in RAT type by including the AVP "Event Trigger" with value "RAT Type" and the AVP "RAT Type" with value "UTRAN" to indicate that the new RAT type is UTRAN. In this way, the PCRF 30 becomes aware that the UE 10 now using UTRAN for connecting to the telecommunications network. The PCRF 30 may use this information for performing a policy decision. For example, the PCRF 30 may decide to remove or otherwise modify a previously installed PCC rule, e.g., as installed with message 403. The PCRF 30 may indicate the policy decision to the PGW 40 by sending message 406 to the PGW 40. Message 406 may be an update CCA message of the Diameter based protocol on the Gx interface. For example, message 406 may request removal or other modification of the PCC rule installed with message 403, e.g., because this PCC rule is not applicable for other RAT types than E-UTRAN.

Step 407 indicates a further handover of the UE 10 from UTRAN to GERAN. Since this handover does not correspond to a change to or from the RAT type specified in message 403, the PGW 40 does not detect the RAT type change as event to be reported and does send a report to the PCRF 30.

Step 408 indicates a still further handover of the UE 10 from GERAN to E-UTRAN. Since this handover corresponds to a change to or from the RAT type specified in message 403, the PGW 40 detects the RAT type change as event to be reported and sends message 409 to the PCRF 30. Message 409 may be an update CCR message of the Diameter based protocol on the Gx interface. Message 409 may report the change in RAT type by including the AVP "Event Trigger" with value "RAT Type" and the AVP "RAT Type" with value "E-UTRAN" to indicate that the new RAT type is E-UTRAN. In this way, the PCRF 30 becomes aware that the UE 10 now uses E-UTRAN for connecting to the telecommunications network. The PCRF 30 may use this information for performing a further policy decision. For example, the PCRF 30 may decide to install or configure a PCC rule in the PGW 40, e.g., to configurw a dedicated bearer between the UE 10 and the PGW 40 with certain QoS parameters. The PCRF 30 may indicate the policy decision to the PGW 40 by sending message 410 to the PGW 40. Message 410 may be an update CCA message of the Diameter based protocol on the Gx interface.

As can be seen, the selective reporting allows for avoiding event reports conveying information not needed at the PCRF 30. It should also be understood that procedures which are similar to those as illustrated in FIG. 4 may be applied between other types of nodes, using the corresponding interfaces therebetween and protocol messages supported by these interfaces.

Figure 5:
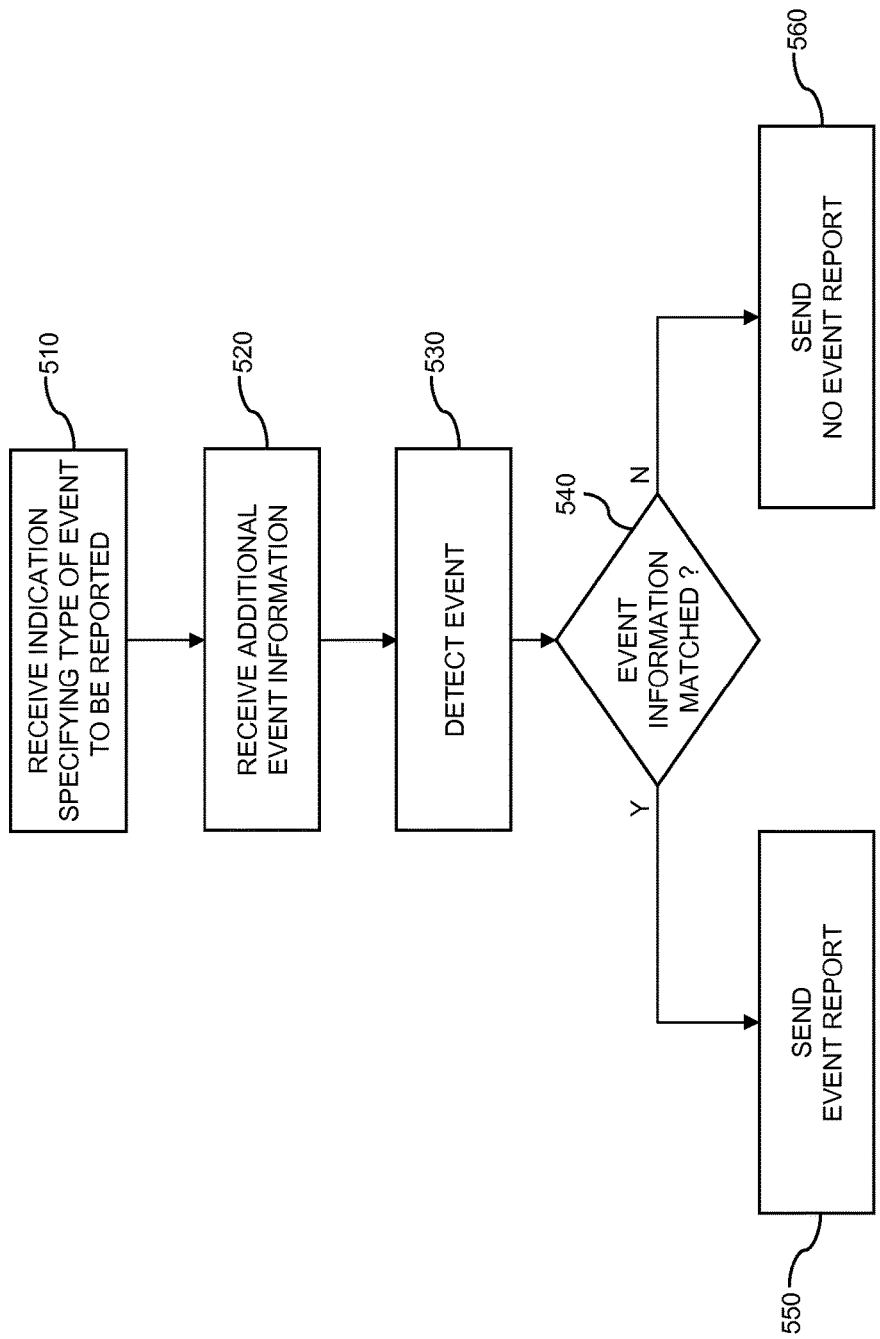
FIG. 5 shows a flowchart for illustrating a method according to an embodiment of the invention.

FIG. 5 shows a flowchart for illustrating a method which may be used for implementing the above concepts in a first node reporting events to a second node. For example, the first node may correspond to the above-mentioned PCEF 42, e.g., implemented in the PGW 40, or BBERF 44, and the second node may correspond to the above-mentioned PCRF 30. Further, the first node may correspond to the above-mentioned PCRF 30 and the second node may correspond to the above mentioned TDF 46 or AF 50.

At step 510, the first node receives an indication from the second node. The indication specifies a type of an event which is to be reported from the first node to the second node. The event type may for example be a change in RAT type used by the UE for connecting to the telecommunications network, a change of the PLMN used by the UE for connecting to the telecommunications network, a change in the time zone in which the UE is located, or a change in the location of the UE, e.g., a cell change, a change of Routing Area (RA), or a change of Service Area (SA). Other types of events are possible as well, e.g., as specified in 3GPP TS 23.203, 29.212, or 29.214. For example, this indication may be received in a message of a Diameter based protocol. The indication may be included in a corresponding information element, e.g., in an AVP.

At step 520, the first node receives additional information from the second node. The additional information has the purpose of specifying a subtype of the event to be reported. In particular, if the type of event to be reported is a change in RAT type, the additional information may specify at least one RAT type. The subtype of the event may then be a change to or from this specific RAT type. If the additional information specifies two RAT types, the subtype of the event may be a change between these two RAT type. If the type of event to be reported is a change of PLMN, the additional information may specify at least one PLMN, e.g., by using an identifier of the PLMN such as the Mobile Country Code (MCC) and Mobile Network Code (MNC). The subtype of the event may then be a change to or from this specific PLMN. If the additional information specifies two PLMNs, the subtype of the event may be a change between these two PLMNs. If the type of event to be reported is a change of time zone, the additional information may specify at least one time zone, e.g., in terms of a time zone identifier and/or an offset from Coordinated Universal Time (UTC). The subtype of the event may then be a change to or from this specific time zone. If the additional information specifies two time zones, the subtype of the event may be a change between these two time zones. If the type of event to be reported is a change in location, the additional information may specify at least one area, e.g., in terms of a Cell Global Identifier (CGI), a Routing Area Identifier (RAI), or a Service Area Identifier (SAI). The subtype of the event may then be a change to or from this specific area. If the additional information specifies two areas, the subtype of the event may be a change between these two areas.

The additional information may be included in a second information element which is associated with the above-mentioned first information element by including an indication of the type of event specified in the first information element. The second information element may be a further AVP. The second information element, or more generally the additional information, may be included in a message of a Diameter based protocol, e.g., in the same message as mentioned in connection with step 510.

At step 530, the first node detects an event. At step 540, the first node checks whether the event corresponds to the event type specified by the indication of step 510 and to the subtype specified by the additional information, i.e., whether the detected event matches the additional information. If this is the case, the event is detected as event of the specified event type and subtype and the method may proceed with step 550, as indicated by branch "Y".

At step 550, in response to detecting the event of the specified event type and subtype, the first node sends a report of the detected event to the second node. This may be accomplished in a message of a Diameter based protocol. The report may indicate that an event of the specified event type and specified subtype occurred. Further, the report may also include further information on the detected event. For example, if the detected event is a change in RAT type, the report may indicate the new RAT type after the change. If the detected event is a change of PLMN, the report may indicate the new PLMN after the change. If the detected event is a change of time zone, the report may indicate the new time zone after the change. If the detected event is a change in location, the report may indicate the new location after the change.

If the check of step 540 reveals that the event does not correspond to the specified event type and subtype the method may proceed with step 560, as indicated by branch "N". In this case, as illustrated by step 560, the first node does not send a report of the detected event.

As can be seen, the method of FIG. 5 allows for selectively reporting events of a specific subtype, while leaving events not corresponding to this specific subtype unreported. In this way, load on nodes and interfaces involved in the reporting can be efficiently limited.

Figure 6:
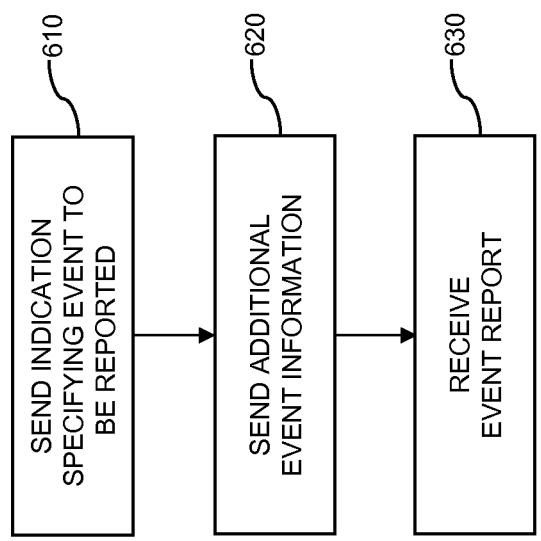
FIG. 6 shows a flowchart for illustrating a further method according to an embodiment of the invention.

FIG. 6 shows a flowchart for illustrating a method which may be used for implementing the above concepts in a second node subscribing to event reporting at a first node. For example, the first node may correspond to the above-mentioned PCEF 42, e.g., implemented in the PGW 40, or BBERF 44, and the second node may correspond to the above-mentioned PCRF 30. Further, the first node may correspond to the above-mentioned PCRF 30 and the second node may correspond to the above mentioned TDF 46 or AF 50.

At step 610, the second node sends an indication to the first node. The indication specifies a type of an event which is to be reported from the first node to the second node. The event type may for example be a change in RAT type used by the UE for connecting to the telecommunications network, a change of the PLMN used by the UE for connecting to the telecommunications network, a change in the time zone in which the UE is located, or a change in the location of the UE, e.g., a cell change, a change of RA, or a change of SA. Other types of events are possible as well, e.g., as specified in 3GPP TS 23.203, 29.212, or 29.214. For example, this indication may be received in a message of a Diameter based protocol. The indication may be included in a corresponding information element, e.g., in an AVP.

At step 620, the second node sends additional information to the second node. The additional information has the purpose of specifying a subtype of the event to be reported. In particular, if the type of event to be reported is a change in RAT type, the additional information may specify at least one RAT type. The subtype of the event may then be a change to or from this specific RAT type. If the additional information specifies two RAT types, the subtype of the event may be a change between these two RAT type. If the type of event to be reported is a change of PLMN, the additional information may specify at least one PLMN, e.g., by using an identifier of the PLMN such as the MCC and MNC. The subtype of the event may then be a change to or from this specific PLMN. If the additional information specifies two PLMNs, the subtype of the event may be a change between these two PLMNs. If the type of event to be reported is a change of time zone, the additional information may specify at least one time zone, e.g., in terms of a time zone identifier and/or an offset from UTC. The subtype of the event may then be a change to or from this specific time zone. If the additional information specifies two time zones, the subtype of the event may be a change between these two time zones. If the type of event to be reported is a change in location, the additional information may specify at least one area, e.g., in terms of a CGI, a RAI, or a SAI. The subtype of the event may then be a change to or from this specific area. If the additional information specifies two areas, the subtype of the event may be a change between these two areas.

The additional information may be included in a second information element which is associated with the above-mentioned first information element by including an indication of the type of event specified in the first information element. The second information element may be a further AVP. The second information element, or more generally the additional information, may be included in a message of a Diameter based protocol, e.g., in the same message as mentioned in connection with step 610.

At step 630, in response to an event of the event type specified by the indication of step 610 and of the subtype specified by the additional information, the second node receives a report of the detected event from the first node. This may be accomplished in a message of a Diameter based protocol. The report may indicate that an event of the indicated event type and specified subtype occurred. Further, the report may also include further information on the detected event. For example, if the detected event is a change in RAT type, the report may indicate the new RAT type after the change. If the detected event is a change of PLMN, the report may indicate the new PLMN after the change. If the detected event is a change of time zone, the report may indicate the new time zone after the change. If the detected event is a change in location, the report may indicate the new location after the change.

As can be seen, the methods of FIGS. 5 and 6 may be combined with each other in a system in which the first node reports events in accordance with the method of FIG. 5, using information provided by the second node operating in accordance with the method of FIG. 6.

Figure 7:
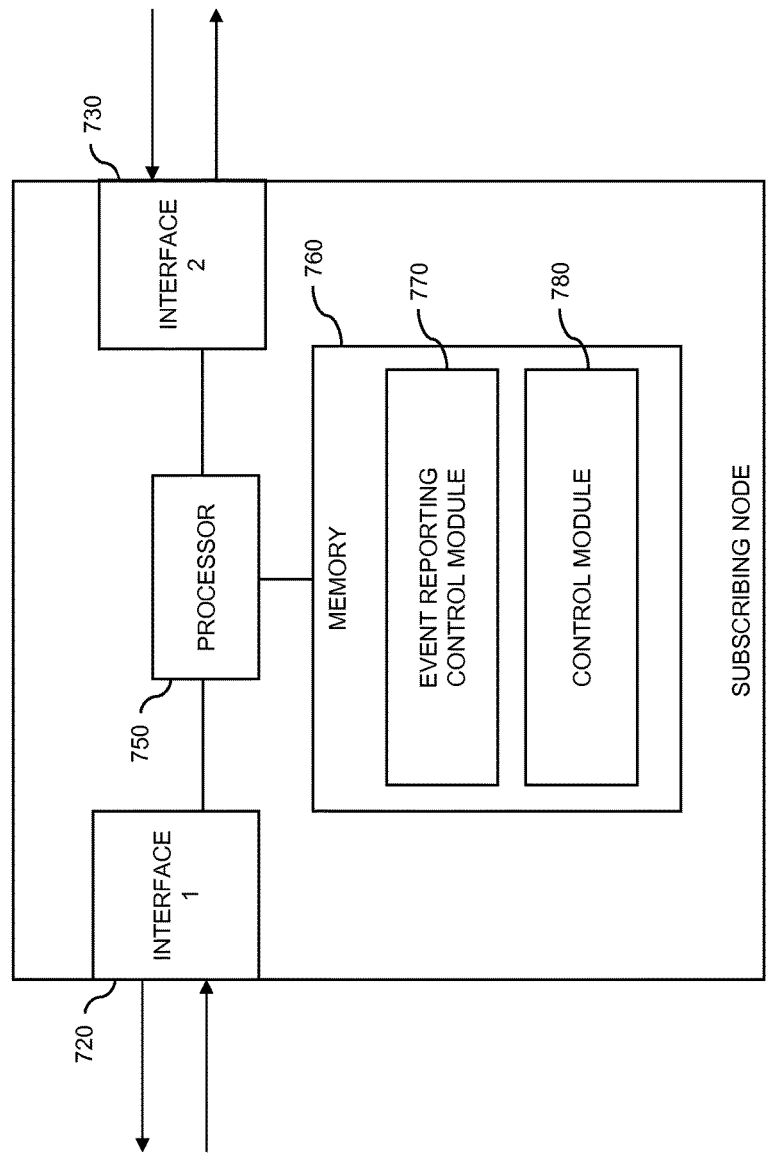
FIG. 7 schematically illustrates a subscribing node according to an embodiment of the invention.

FIG. 7 illustrates an exemplary implementation of functionalities of the first node, i.e., subscribing node. For example, the subscribing node may implement the above-mentioned PCRF 30, the above-mentioned AF 50, or the above-mentioned TDF 46.

As illustrated, the node may include a first interface 720 and a second interface 730. The first interface 720 may be associated with typical functionalities of the node, e.g., control functionalities or traffic processing functionalities. For example, if the node implements the PCRF 30, the first interface 720 may correspond to one of the above-described interfaces of the PCRF 30, e.g., the Rx interface, the Gx interface, the Gxx interface, the Sd interface, the Sy interface, or the Sp interface. If the node implements the AF 50, the first interface 720 may correspond to an interface for application layer signaling. If the node implements the TDF 46, the first interface 720 may correspond to an interface for receiving, and optionally also forwarding, user plane data traffic monitored by the TDF 46. The second interface 730 may be used for implementing the event reporting functionalities as described herein, i.e., for sending the indication of the event type to be reported and additional information, and also for receiving the report of the detected event. For example, if the node implements the PCRF 30, the second interface 730 may correspond to the Gx interface or to the Gxx interface. If the node implements the AF 50, the second interface 730 may correspond to the Rx interface. If the node implements the TDF 46, the second interface 730 may correspond to the Sd interface.

Further, the node includes a processor 750 coupled to the interfaces 720, 730 and a memory 760 coupled to the processor 750. The memory 760 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 760 includes suitably configured program code to be executed by the processor 750 so as to implement the above-described functionalities of the subscribing node. More specifically, the memory 760 may include an event reporting control module 770 so as to implement the above-described functionalities for subscribing to event reporting at a further node and providing the additional information for selectively controlling the event reporting. Further, the memory 760 may also include a control module 780 for implementing general control functionalities of the node. Such control functionalities may in particular involve receiving one or more reports of a detected event from the further node.

It is to be understood that the structure as illustrated in FIG. 7 is merely schematic and that the node may actually include further components which, for the sake of clarity, have not been illustrated, e.g., further interfaces. Also, it is to be understood that the memory 760 may include further types of program code modules, which have not been illustrated, e.g., program code modules for implementing known functionalities of a PCRF AF, or TDF. According to some embodiments, also a computer program product may be provided for implementing functionalities of the node, e.g., in the form of a medium storing the program code to be stored in the memory 760.

Figure 8:
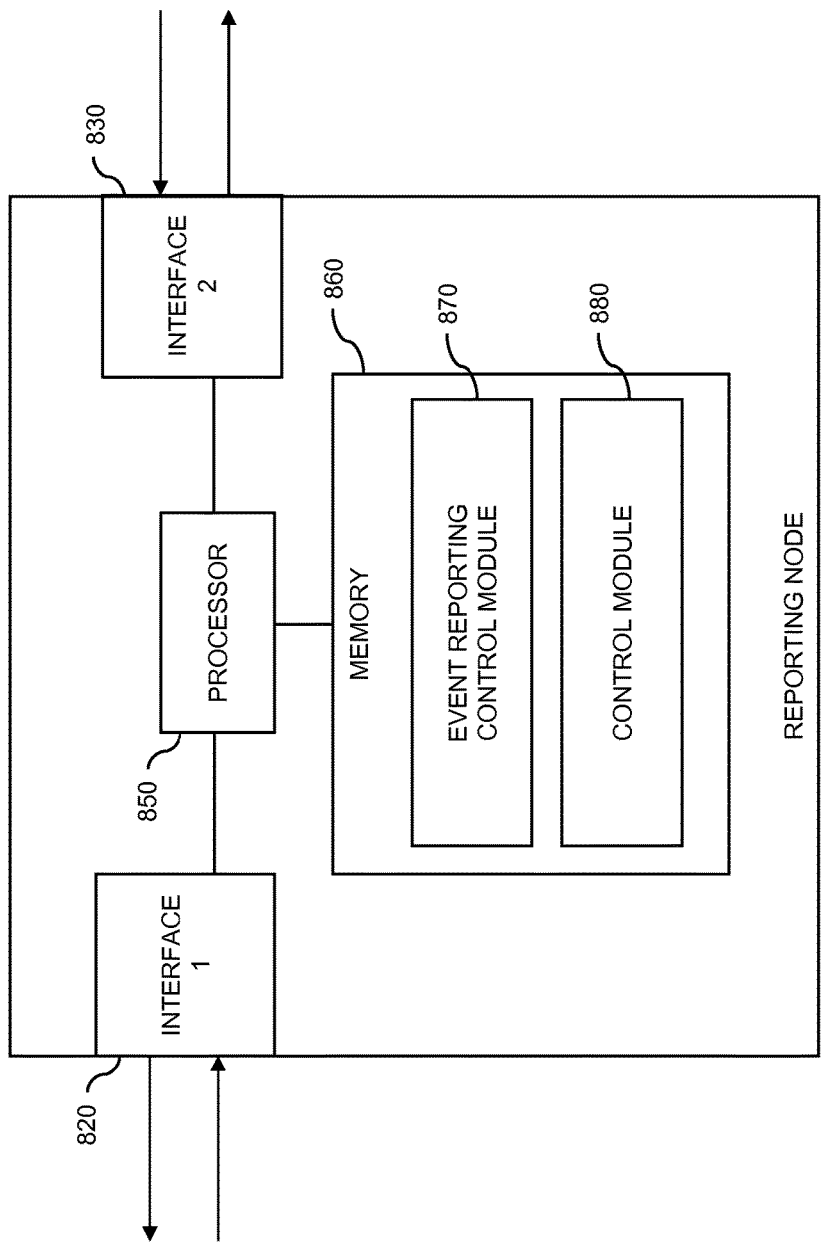
FIG. 8 schematically illustrates a reporting node according to an embodiment of the invention.

FIG. 8 illustrates an exemplary implementation of functionalities of the second node, i.e., reporting node. For example, the reporting node may correspond to the above-mentioned PCEF 42, to the above-mentioned BBERF 44, or to the above-mentioned PCRF 30.

As illustrated, the node may include a first interface 820 and a second interface 830. The first interface 820 may be associated with typical functionalities of the node, e.g., control functionalities or traffic processing functionalities. For example, if the node implements the PCEF 42 or BBERF 44, the first interface 820 may correspond to an interface for receiving and forwarding user plane data traffic of a UE. If the node implements the PCRF 30, the first interface 720 may correspond to one of the above-described interfaces of the PCRF 30, e.g., the Rx interface, the Gx interface, the Gxx interface, the Sd interface, the Sy interface, or the Sp interface. The second interface 830 may be used for implementing the event reporting functionalities as described herein, i.e., for receiving the indication of the event type to be reported and additional information, and also for sending the report of the detected event. For example, if the node implements the PCEF 42, the second interface 830 may correspond to the Gx interface. If the node implements the BBERF 44, the second interface 830 may correspond to the Gxx interface. If the node implements the PCRF 30, the second interface 830 may correspond to the Rx interface or to the Sd interface.

Further, the node includes a processor 850 coupled to the interfaces 820, 830 and a memory 860 coupled to the processor 850. The memory 860 may include a ROM, e.g., a flash ROM, a RAM, e.g., a DRAM or SRAM, a mass storage, e.g., a hard disk or solid state disk, or the like. The memory 860 includes suitably configured program code to be executed by the processor 850 so as to implement the above-described functionalities of the reporting node. More specifically, the memory 860 may include a event reporting control module 870 so as to implement the above-described functionalities for selective event reporting on the basis of an event type and additional information specifying an event subtype as provided by a further node. Further, the memory 860 may also include a control module 880 for implementing general control functionalities of the node.

It is to be understood that the structure as illustrated in FIG. 8 is merely schematic and that the node may actually include further components which, for the sake of clarity, have not been illustrated, e.g., further interfaces. Also, it is to be understood that the memory 860 may include further types of program code modules, which have not been illustrated, e.g., program code modules for implementing known functionalities of a PCEF, BBERF, or PCRF. According to some embodiments, also a computer program product may be provided for implementing functionalities of the policy controller, e.g., in the form of a medium storing the program code to be stored in the memory 860.

As can be seen, the concepts as described above may be used for implementing event reporting in an efficient manner. In particular, the concepts may be used for applying event reporting also with respect to frequently occurring event types.

It is to be understood that the examples and embodiments as explained above are merely illustrative and susceptible to various modifications. For example, the concepts as described herein could be used in various types of telecommunications networks, e.g., combining different types of access technology, including non-cellular broadband access technology. Further, it should be noted that in some implementations of the a node may act both as a subscribing node and a reporting node. For example, the PCRF 30 may subscribe to event reporting by the PCEF 42 or BBERF 44 while at the same time selectively reporting events to the AF 50 or TDF 46. Moreover, it is to be understood that the above concepts may be implemented by using correspondingly designed software to be executed by a processor of an existing device, or by using dedicated device hardware. Still further, it is to be understood that the above-mentioned nodes such as the AF 50, PCRF 30, PCEF 42, BBERF 44, or TDF 46 may each be implemented by a single device or by multiple devices, e.g., by a device cloud or the like.

The invention claimed is:

1. A method of event reporting between a first node and a second node of a mobile telecommunications network, the method comprising:
   the first node receiving from the second node a first attribute value pair of a Diameter protocol for implementing communication between the first node and the second node, the first attribute value pair specifying a type of an event which is to be reported from the first node to the second node, the type of event comprising one of: a change in radio access technology (RAT) type; a change in public land mobile network (PLMN); a change in time zone; and a change in location;
   the first node receiving from the second node a second attribute value pair, different from the first attribute value pair, of the Diameter protocol, the second attribute value pair comprising additional information for specifying a subtype of the type of the event specified in the first attribute value pair, the second attribute value pair being associated with the first attribute value pair by comprising an indication of the type of event specified in the first attribute value pair; and
   in response to the first node detecting the event of said type and subtype, the first node sending a report of the detected event to the second node, the report of the detected event including information on a change that occurred as a result of the detected event of said type and subtype, wherein the information on the change that occurred as a result of the detected event of said type and subtype comprises information on one of: a new RAT type after the change responsive to the event being a change in RAT type and the subtype specifies the change in RAT type is the RAT type changing to or from a RAT type specified by the subtype; a new PLMN after the change responsive to the event being is a change in PLMN and the subtype specifies the change in PLMN is the PLMN changing to or from a PLMN specified by the subtype; a new time change after the change responsive to the event being a change in time zone and the subtype specifies the change in time zone is the time changing to or from a time zone specified by the subtype; and a new location after the change responsive to the event being a change in location and the subtype specifies the change in location is the location changing to or from a location specified by the subtype.

2. The method according to claim 1,
   wherein the type of the event corresponds to a change in RAT used by a user equipment for connecting to the telecommunications network and the additional information for specifying the subtype specifies said additional information for specifying the subtype specifies a first type of radio access technology and a second type of radio access technology that is different from the first type of radio access technology, and said change in radio access technology is between the first type of radio access technology and the second type of radio access technology.

3. The method according to claim 1,
   wherein the type of the event corresponds to a change in public land mobile network used by a user equipment for connecting to the telecommunications network and the additional information for specifying the subtype specifies at least one public land mobile network to or from which the change occurs.

4. The method according to claim 1,
   wherein the type of the event corresponds to a change of the time zone in which a user equipment is located and the additional information for specifying the subtype specifies at least one time zone to or from which the change occurs.

5. The method according to claim 1,
   wherein the type of the event corresponds to a change in location of a user equipment and the additional information for specifying the subtype specifies at least one area to or from which the change occurs.

6. The method according to claim 1,
   wherein the first node is implemented in a gateway and the second node is a policy controller.

7. The method according to claim 1,
   wherein the first node is a policy controller and the second node is implemented in an application server or traffic monitoring device.

8. The method according to claim 1, wherein the first attribute value pair and the second attribute value pair are transmitted in a same message of the Diameter protocol.

9. The method of claim 1, further comprising:
   the first node detecting an event of a second type occurring; and
   the first node determining whether the event of the second type is an event of the subtype of the event of the second type or is not an event of the subtype of the event of the second type,
   wherein no report is sent responsive to the first node determining the event of said second type occurring is not an event of the subtype of the event of the second type.

10. The method of claim 1, wherein the subtype of event specifies the change of event type is the event type changing to or from a specified event type, the method further comprising
    the first node receiving from the second node a new second attribute value pair comprising additional information for specifying a new subtype of the type of the event specified in the first attribute value pair to replace the second attribute value pair, the new second attribute value pair received after receiving the first attribute value pair, the new second attribute value pair different from the first attribute value pair and the second attribute value pair, the new second attribute value pair replacing the second attribute value pair and associated with the first attribute value pair by comprising an indication of the type of event specified in the first attribute value pair,
    wherein the report is sent to the further node responsive to detecting an event of said type specified in the first attribute pair and said new subtype specified in the new second attribute value pair.

11. A method of event reporting between a first node and a second node of a mobile telecommunications network, the method comprising:
    the second node sending to the first node a first attribute value pair of a Diameter protocol for implementing communication between the first node and the second node, the first attribute value pair specifying a type of an event which is to be reported from the first node to the second node, the type of event comprising at least one of: a change in radio access technology (RAT) type; a change in public land mobile network (PLMN); a change in time zone; and a change in location;

the second node sending to the first node a second attribute value pair, different from the first attribute value pair of the Diameter protocol, the second attribute value pair comprising additional information for specifying a subtype of the type of the event specified in the first attribute value pair, the second attribute value pair being associated with the first attribute value pair by comprising an indication of the type of event specified in the first attribute value pair; and in response to the event of said type and subtype occurring, the second node receiving a report of the event from the first node, the report of the event including information on a change that occurred as a result of the event of said type and subtype, wherein the information on the change that occurred as a result of the detected event of said type and subtype comprises information on one of: a new radio access technology (RAT) type after the change responsive to the event being a change in RAT type and the subtype specifies the change in RAT type is the RAT type changing to or from a RAT type specified by the subtype; a new public land mobile network (PLMN) after the change responsive to the event being a change in PLMN and the subtype specifies the change in PLMN is the PLMN changing to or from a PLMN specified by the subtype; a new time change after the change responsive to the event being a change in time zone and the subtype specifies the change in time zone is the time zone changing to or from a time zone specified by the subtype; and a new location after the change responsive to the event being a change in location and the subtype specifies the change in location is the location changing to or from a location specified by the subtype.

12. The method according to claim 11, wherein the first attribute value pair and the second attribute value pair are transmitted in a same message of the Diameter protocol.

13. A node for a mobile telecommunications network, comprising:
an interface with respect to a further node of the telecommunications network; and
a processor;
wherein the processor is configured to perform operations comprising:
receiving from the further node a first attribute value pair of a Diameter protocol for implementing communication between the node and the further node, the first attribute value pair specifying a type of an event which is to be reported from the node to the further node, the type of event comprising at least one of: a change in radio access technology (RAT) type; a change in public land mobile network (PLMN); a change in time zone; and a change in location,
receiving from the further node a second attribute value pair, different from the first attribute value pair, of the Diameter protocol, the second attribute value pair comprising additional information for specifying a subtype of the type of the event specified in the first attribute value pair, the second attribute value pair element being associated with the first attribute value pair by comprising an indication of the type of event specified in the first attribute value pair, and
in response to detecting the event of said type and subtype, sending a report of the detected event to the further node, the report of the detected event including information on a change that occurred as a result of the detected event of said type and subtype, wherein the information on the change that occurred as a result of the detected event of said type and subtype comprises information on one of: a new radio access technology (RAT) type after the change responsive to the event being a change in RAT type and the subtype specifies the change in RAT type is the RAT type changing to or from a RAT type specified by the subtype; a new public land mobile network (PLMN) after the change responsive to the event being a change in PLMN and the subtype specifies the change in PLMN is the PLMN changing to or from a PLMN specified by the subtype; a new time zone after the change responsive to the event being a change in time zone and the subtype specifies the change in time zone is the time zone changing to or from a time zone specified by the subtype; and a new location after the change responsive to the event being a change in location and the subtype specifies the change in location is the location changing to or from a location specified by the subtype.

14. The node according to claim 13,
wherein the type of the event corresponds to a change in radio access technology used by a user equipment for connecting to the telecommunications network and the additional information for specifying the subtype specifies at least one radio access technology to or from which the change occurs; and
wherein the additional information for specifying the subtype specifies a first type of radio access technology and a second type of radio access technology that is different from the first type of radio access technology, and said change in radio access technology is between the first type of radio access technology and the second type of radio access technology.

15. The node according to claim 13, wherein the first attribute value pair and the second attribute value pair are transmitted in a same message of the Diameter protocol.

16. A node for a mobile telecommunications network, comprising:
an interface with respect to a further node of the telecommunications network; and
a processor;
wherein the processor is configured to perform operations comprising:
sending to the further node a first attribute value pair of a Diameter protocol for implementing communication between the first node and the further node, the first attribute value pair specifying a type of an event which is to be reported from the further node to the node, the type of event comprising at least one of: a change in radio access technology (RAT) type; a change in public land mobile network (PLMN); a change in time zone; and a change in location;
sending to the further node a second attribute value pair, different from the first attribute value pair, of the Diameter protocol, the second attribute value pair comprising additional information for specifying a subtype of the type of the event specified in the first attribute value pair, the second attribute value pair being associated with the first attribute value pair by comprising an indication of the type of event specified in the first attribute value pair, and
in response to the event of said type and subtype occurring, receiving a report of the event from the further node, the report of the event including information on a change that occurred as a result of the event of said type and subtype, wherein the information on the change that occurred as a result of the detected event of said type and subtype comprises information on one of: a new radio access technology (RAT) type after the change responsive to the event being a change in RAT type and the subtype specifies the change in RAT type is the RAT type changing to or from a RAT type specified by the subtype; a new public land mobile network (PLMN) after the change responsive to the event being a change in PLMN and the subtype specifies the change in PLMN is the PLMN changing to or from a PLMN specified by the subtype; a new time zone after the change responsive to the event being a change in time zone and the subtype specifies the change in time zone is the time zone changing to or from a time zone specified by the subtype; and a new location after the change responsive to the event being a change in location and the subtype specifies the change in location is the location changing to or from a location specified by the subtype.

17. The node according to claim 16,
wherein the type of the event corresponds to a change in radio access technology used by a user equipment for connecting to the telecommunications network and the additional information for specifying the subtype specifies at least one radio access technology to or from which the change occurs; and
wherein the additional information for specifying the subtype specifies a first type of radio access technology and a second type of radio access technology that is different from the first type of radio access technology, and said change in radio access technology is between the first type of radio access technology and the second type of radio access technology.

18. The node according to claim 16, wherein the first attribute value pair and the second attribute value pair are transmitted in a same message of the Diameter protocol.

19. A computer program product comprising a non-transitory computer readable medium storing computer readable program code that, when executed by a processor of a node of a mobile telecommunications network, causes the node to operate as the first node or second node of the method according to claim 1.

* * * * *